July 5, 1955

C. M. HAJEWSKI 2,712,274

TWO SPINDLE MILLING MACHINE

Filed Dec. 7, 1949

INVENTOR
Cyril M. Hajewski

July 5, 1955

C. M. HAJEWSKI 2,712,274

TWO SPINDLE MILLING MACHINE

Filed Dec. 7, 1949

INVENTOR
Cyril M. Hajewski

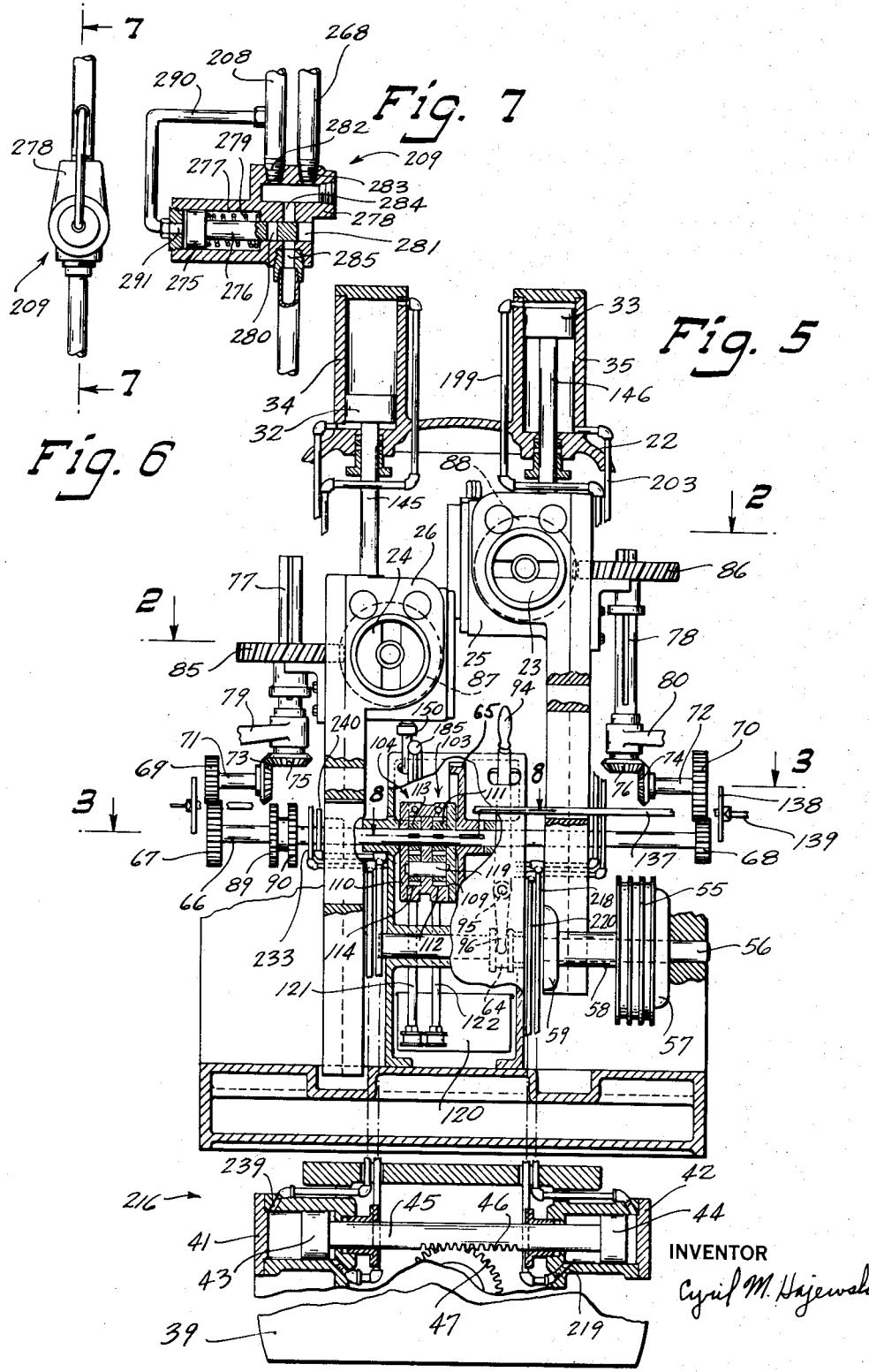

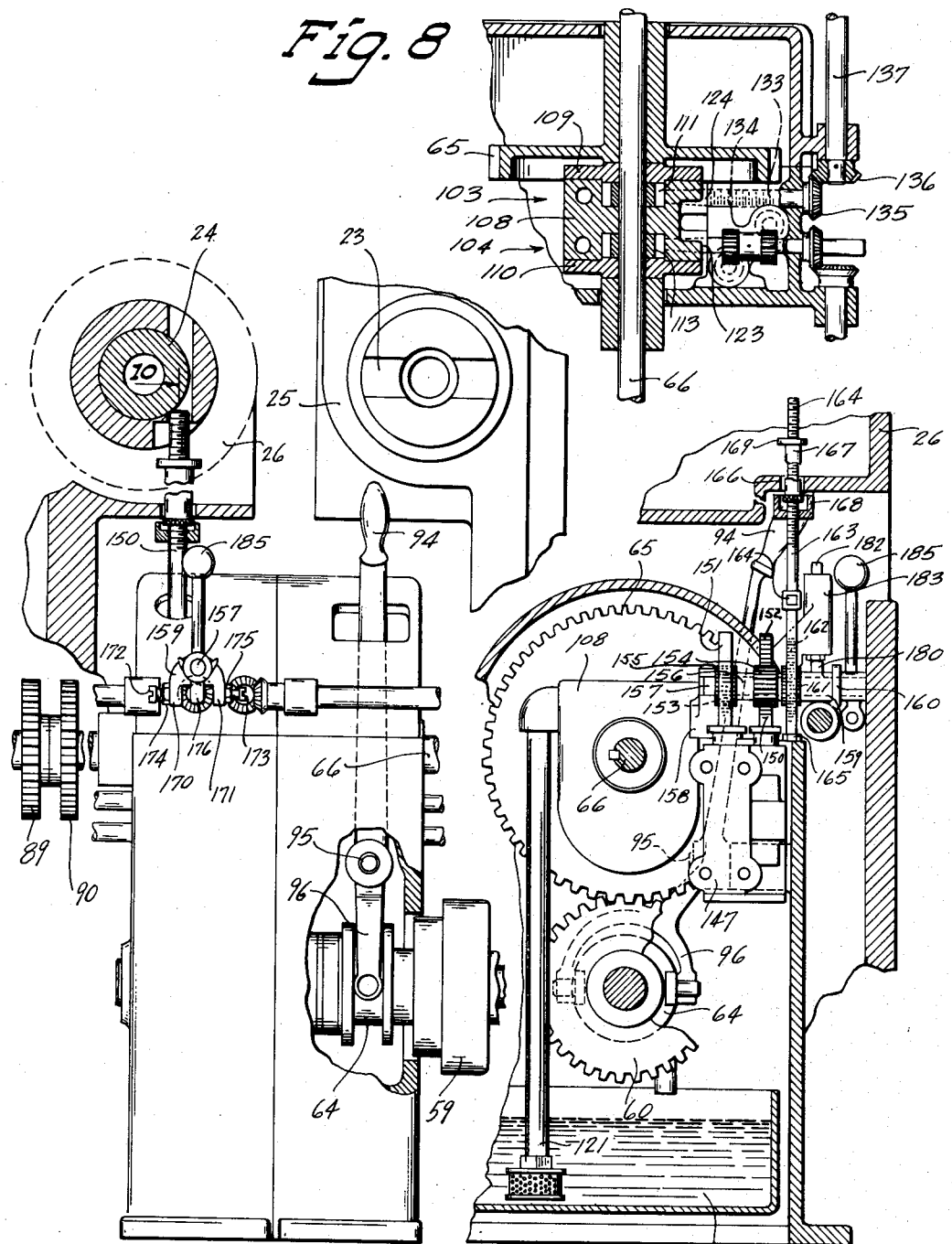

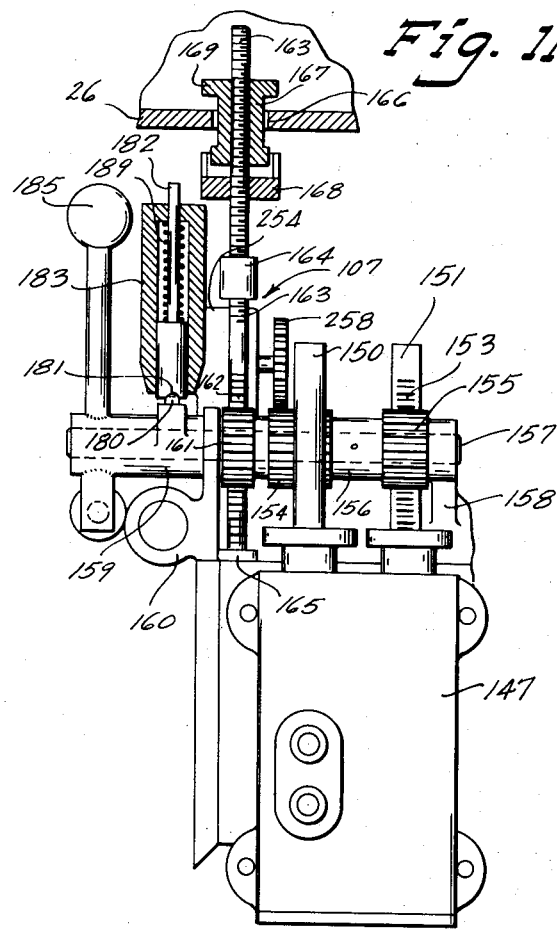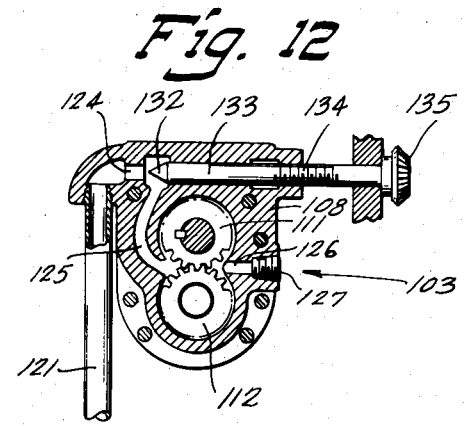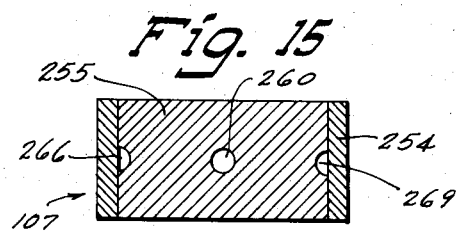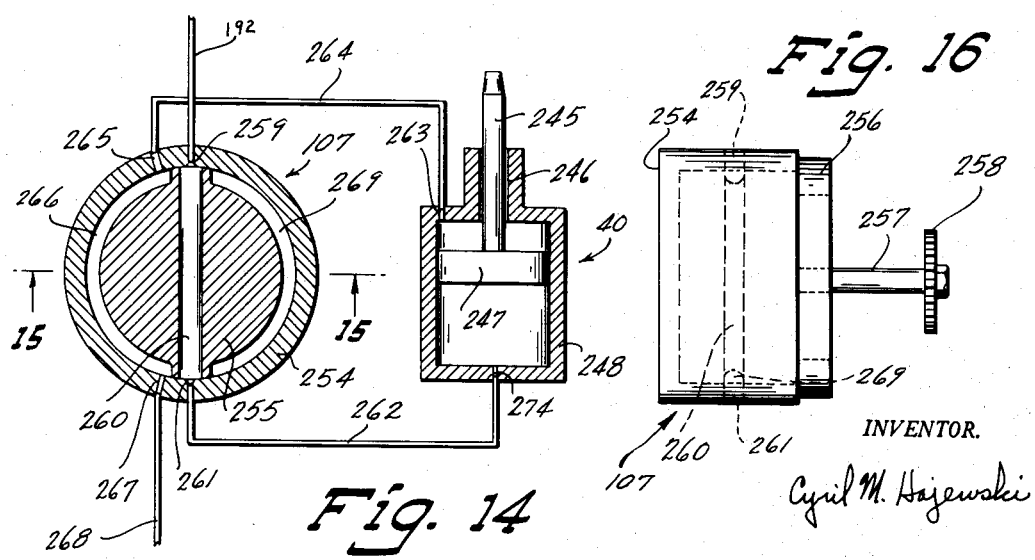

July 5, 1955  C. M. HAJEWSKI  2,712,274
TWO SPINDLE MILLING MACHINE
Filed Dec. 7, 1949  7 Sheets-Sheet 7

INVENTOR
Cyril M. Hajewski

United States Patent Office 2,712,274
Patented July 5, 1955

2,712,274

TWO SPINDLE MILLING MACHINE

Cyril M. Hajewski, Milwaukee, Wis., assignor to Kearney & Trecker Corporation, West Allis, Wis., a corporation of Wisconsin Application December 7, 1949, Serial No. 131,616

11 Claims. (Cl. 90—15)

This invention relates generally to milling machines and more particularly to a milling machine especially adapted for rapid machining of production parts.

A general object of the invention is to provide an improved automatically operating milling machine capable of maximum production in machining workpieces.

Another object of the invention is to provide an improved milling machine capable of rapidly performing repetitive identical machining operations on a large number of pieces.

Another object is to provide an improved milling machine for rapid machining of production pieces with the spindle and table movements automatically controlled.

Another object is to provied a milling machine capable of automatically performing a cycle of operations so correlated that the machining operations on successive workpieces are accomplished in a substantialy continuous manner.

Another object is to provide an improved mechanism for automatically effecting a cycle of operation of a milling machine.

Another object is to provide an improved clamping arrangement for locking the work supporting table of a machine tool in position.

A further object is to provide an improved control valve for automatically operating a clamp to lock a movable element of a machine tool in position.

According to this invention, an automatic milling machine is arranged to effect substantially continuous machining of a large number of workpieces to provide for maximum production. The machine is equipped with two movable spindle heads mounted on the column of the machine to reciprocate transversely in a vertical plane, one direction of movement constituting the cutting stroke and the other the idle stroke in which the spindle head is returning to its starting position. The work supporting table is provided with two work holding stations, one for each of the spindle heads, disposed at opposite ends and the table is mounted to pivot between two operating positions. In each position, one of the work holding stations is adjacent to the path of travel of its cooperating spindle head for the workpiece to be operated upon, while the other work holding station is withdrawn from the path of travel of its spindle head in the loading position where the operator removes the completed workpiece and replaces it with another. While the operator is replacing the completed workpiece another is being machined at the other work holding station. The table is locked in its operating positions by a plunger entering one of two openings bored in the table at locations conforming to the desired final positions. Upon completion of the machining operation on a workpiece, the plunger is automatically withdrawn from the opening in the table to release it and the table is automatically pivoted to its alternate position. Pivoting of the table results in withdrawing the completed workpiece from the path of travel of the cutter and presenting a new workpiece placed at the other work holding station to the opposite cutter. The direction of travel of the spindle heads is also automatically reversed so that the cutter to which a new workpiece has been presented is initiated in its cutting stroke. The operator then removes the completed workpiece from the table and replaces it with a new one. This arrangement greatly reduces the time required to perform a production machining operation on a large number of pieces.

The foregoing and other objects of this invention which will become more fully apparent from the following detailed specification may be achieved by means of the particular milling machine constituting an exemplifying embodiment of the invention that is depicted in and described in connection with the accompanying drawings, in which:

Fig. 5 is a combined partly diagrammatic view largely in vertical longitudinal section, taken substantially along the line 5—5 in Fig. 1 together with a plan view of the table added thereto, a portion of the table having been broken away to show its hydraulic actuating mechanism;

Fig. 6 is a detailed view in front elevation of the back pressure valve shown diagrammatically in Fig. 13;

Fig. 7 is a detailed view in vertical section through the back pressure valve, taken along the medial plane represented by the line 7—7 in Fig. 6;

Fig. 8 is a fragmentary detailed view in horizontal section, taken along the plane represented by the line 8—8 in Fig. 5;

Fig. 9 is a fragmentary view in front elevation showing the spindles and controls, with parts broken away to illustrate the clutch and brake shifting mechanism;

Fig. 10 is a fragmentary view in vertical section, taken substantially along the plane represented by the line 10—10 in Fig. 9, illustrating the mechanism for actuating the control valves;

Fig. 11 is a fragmentary enlarged view in side elevation of the control valve actuating mechanism shown in Fig. 10;

Fig. 12 is an elevational view of one of the hydraulic pumps forcing fluid through the hydraulic system with the cover removed to depict the internal mechanism;

Fig. 14 is a partly diagrammatic view of the hydraulic circuit for actuating the table clamp including a sectional view through the table clamp control valve;

Fig. 15 is a view in horizontal section through the table clamp control valve along the plane represented by the line 15—15 in Fig. 14; and, Fig. 16 is a view in side elevation of the table clamp control valve.

Referring more specifically to the drawings, the machine tool there shown incorporates a practical, operative embodiment of the improved milling machine to which this invention is directed, the entire apparatus being fully described herein by way of a complete disclosure.

Figure 1:
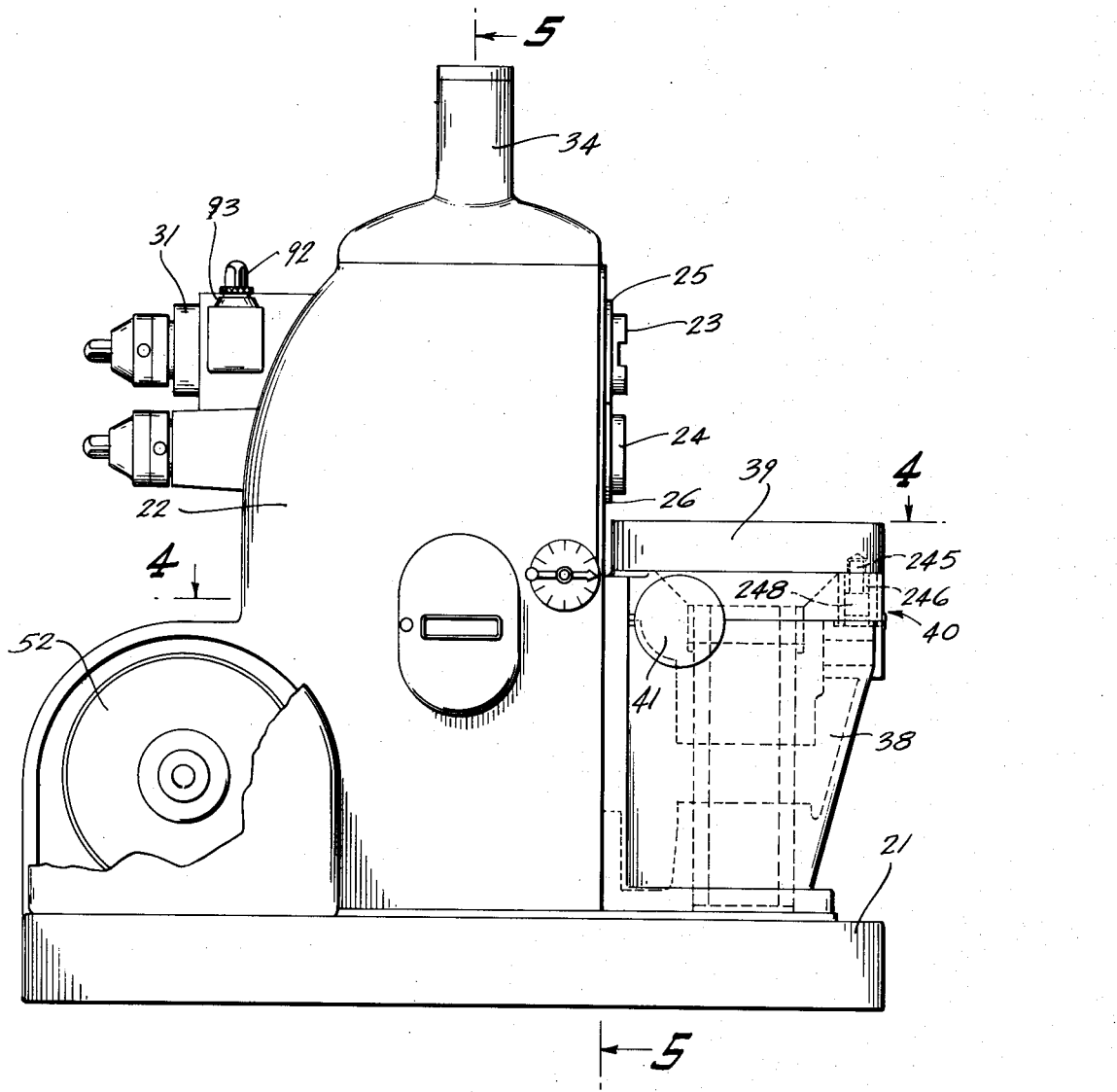
Figure 1 is a view in left side elevation of an automatic milling machine embodying the features of this invention.
Figure 2:
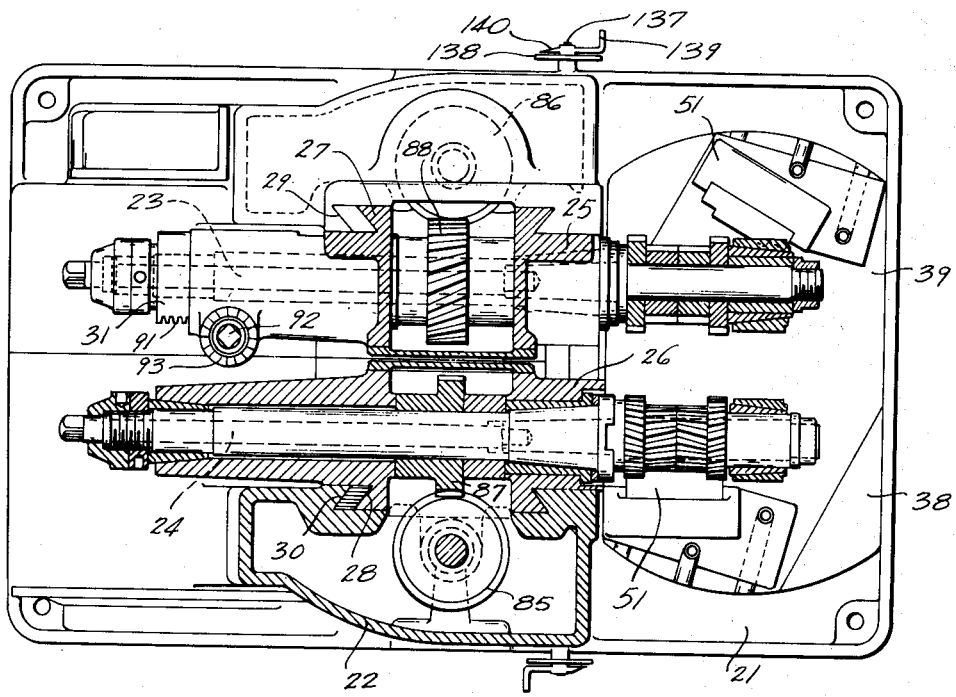
Fig. 2 is a detailed view generally in horizontal section illustrating the spindle arrangement, taken along the line 2—2 in Fig. 5.

As shown in Fig. 1, the general view in side elevation, the machine comprises a base 21 formed integrally with an upstanding column member 22 constituting the main frame or supporting element and carrying cooperating work supporting and tool supporting members. The column 22 forms a housing for the spindle rotating mechanism and a portion of the hydraulic system for actuating the various movable parts of the apparatus and also serves as a support for two bodily movable horizontal tool carrying spindles 23 and 24. As best shown in Fig. 2, spindles 23 and 24 are supported independently in spindle heads 25 and 26, respectively, on which are provided guide bearings 27 and 28 for sliding vertically along cooperating ways 29 and 30 mounted in the column 22. The spindle 23 is supported in a quill 31 to provide for manual horizontal adjustment as will be described. Each of the spindle heads 25 and 26 is connected to one of two pistons 32 and 33 located in their cooperating cylinders 34 and 35, respectively, at the top of the column 22 to which hydraulic power is transmitted for actuating the spindle heads 25 and 26 in their vertical reciprocatory movements.

A hollow bed 38 is rigidly mounted on the base 21 in front of the column 22 to form a support for a work supporting table 39 as well as a housing for an hydraulically operated table clamp generally denoted by the numeral 40 to be later more fully described and a portion of the hydraulic system for actuating the table 39 in an oscillatory movement. Contained within the bed 38 are two horizontally opposed hydraulic cylinders 41 and 42 with their cooperating pistons 43 and 44, respectively. The pistons 43 and 44 are connected in opposed relationship by a common connecting rod 45 provided with a gear rack 46 for engagement with a gear 47 which is fixed to the bottom of the table 39. Hydraulic power is fed to the cylinders 41 and 42 simultaneously at the proper instant to move the pistons 43 and 44 in the same direction, thus imparting a rotating movement to the table 39 through the connecting rod 45, its gear rack 46, and the gear 47. The hydraulic power is supplied to the cylinders 41 and 42 in an opposite direction after each stroke of the spindle heads 25 and 26 to cause the table 39 to oscillate in an arc of predetermined magnitude. Thus the two work stations, one at each end of the table 39 move in an arcuate path and as the table moves, it is always advancing one workpiece 51, illustrated in Fig. 2, to its cooperating cutter and at the same time removing the other away from its cooperating cutter. The table clamp 40 is provided to lock the table 39 in position while a cutting operation is being performed.

The table 39 is arranged to present a new workpiece 51 to one cutter as it returns the finished workpiece from the other cutter to the loading position for removal and replacement. Thus, referring particularly to Fig. 2, one workpiece 51 is being operated on by its cooperating cutter revolving with the spindle 24 which is feeding downwardly. As this cutter is performing a cutting operation, the cutter mounted on spindle 23 is moving upwardly in its idle stroke and the table is in the position shown, where the work station cooperating with spindle 23 is removed from the cutter to allow the operator to remove the finished workpiece and replace it with a new one. When the spindle 24 completes its cutting stroke, the table clamp 40 is automatically released and the table 39 is actuated to assume its other position wherein a new workpiece 51 is presented to its cooperating cutter and the finished workpiece is returned from the cutting position to the loading position. The table 39 having completed its movement, the table clamp 40 is again actuated to lock the table 39 in its new position and the direction of movement of spindles 23 and 24 has been reversed so that the spindle 23 is feeding downwardly in its cutting stroke while the spindle 24 is returning in its idle stroke. The cycle is thus repeated automatically until the machine is stopped manually.

Figure 4:
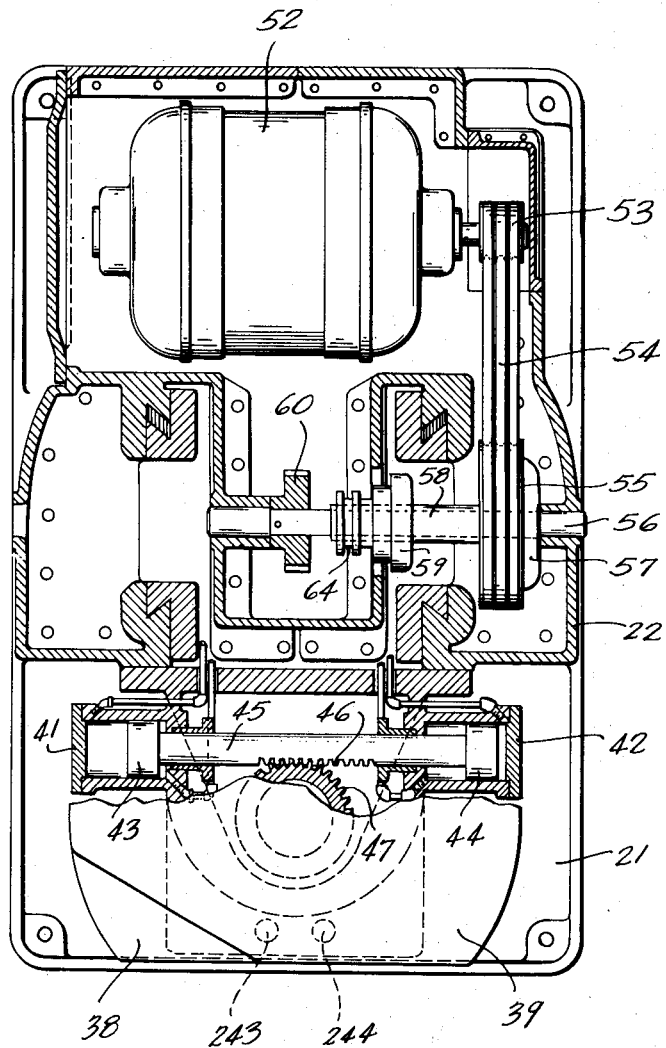
Fig. 4 is a view partly in horizontal section, taken substantially along the line 4—4 in Fig. 1 with parts broken away to show the table driving mechanism.

The mechanism for driving the tool spindles 23 and 24 is arranged to provide for individual speed control. It includes a driving motor 52 mounted within the hollow column 22, as shown in Figs. 1 and 4, having on its shaft a pulley 53 connected by belts 54 with a main driving pulley 55. The driving pulley 55 is selectively connectible to a main driving shaft 56 by means of a friction clutch 57. The main shaft 56 extends through a clutch actuating sleeve 58 and carries a brake 59 and spur gear 60. A shifting collar 64 is fixed to the sleeve 58, as shown in Fig. 4, for the purpose of shifting it either to the left or right to stop and start the rotation of spindles 23 and 24. One end of sleeve 58 is connected to the operating mechanism of the clutch 57 and the other end operates the brake 59. Control means, as will be described later, are connected to the shifting collar 64 for shifting the sleeve 58 either to left or right. When the sleeve 58 is shifted to the right, the clutch 57 is engaged to transmit power from the driving pulley 55 to the shaft 56 and the brake 59 is released. When the sleeve 58 is shifted to the left, the clutch 57 is disengaged to break the power transmission train to the shaft 56 and the brake 59 is applied to quickly stop the rotation of the shaft 56 and, consequently, the spindles 23 and 24 which it drives.

Figure 3:
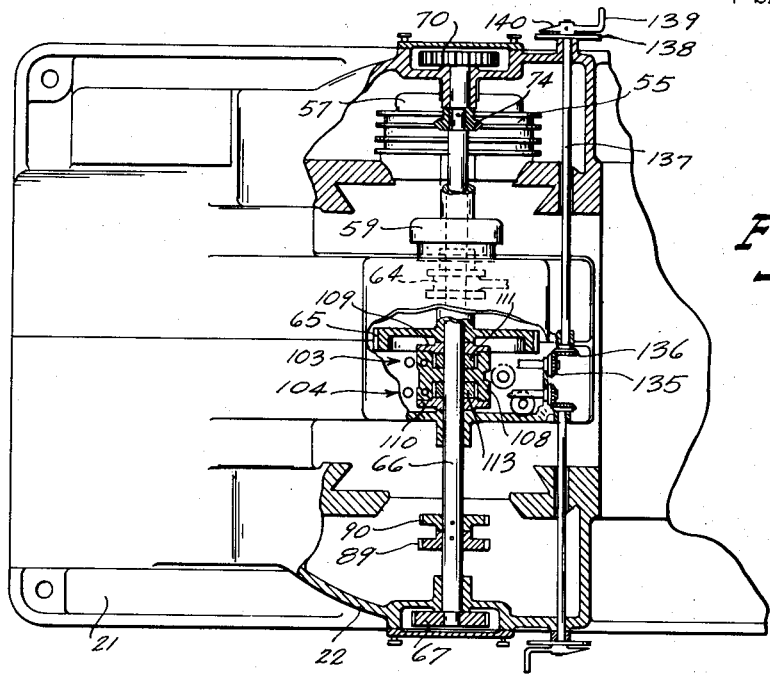
Fig. 3 is a fragmentary detailed view largely in horizontal section showing the main drive shaft for the mechanical transmission, taken along the line 3—3 in Fig. 5.

Power for driving the tool spindles is taken from the shaft 56, as shown in Fig. 4, by means of the spur gear 60 meshing with a cooperating spur gear 65, depicted in Fig. 3, which is mounted on a shaft 66 that extends across the width of the machine to a speed changing mechanism at each of its ends, comprised in this instance of pick-off gears 67 and 68 on the ends of the shaft 66 and meshing with complementary pick-off gears 69 and 70 respectively, mounted on the end of parallel horizontal shafts 71 and 72, as shown in Fig. 5, the pick-off gears being interchangeable and reversible in well known manner to provide for driving the spindles at a selected constant speed. The shafts 71 and 72 are journalled in the column 22 and are provided at their inner ends with bevel gears 73 and 74 which mesh with complementary bevel gears 75 and 76 fixed to the lower ends of vertical shafts 77 and 78 which are journalled in brackets 79 and 80 attached to the column 22. The shafts 77 and 78 have splined engagement with a pair of helical gears 85 and 86 which are slidable along the length of the shafts and mesh with their cooperating helical gears 87 and 88 encircling and fixed on the spindles 24 and 23, respectively, as illustrated in Fig. 2. The helical gears 85 and 86 are supported by the spindle heads 26 and 25 so that as the spindle heads are moved in their vertical paths, the helical gears 85 and 86 will follow the movement, sliding along their respective shafts 77 and 78.

Two spur gears 89 and 90 shown keyed to the shaft 66 are provided for the purpose of driving respectively in the usual manner a lubricant pump and a coolant pump, neither of which are depicted in the drawings.

To provide for axial adjustment of the one spindle 23, it is supported in the quill 31 mounted in the spindle head 25. As shown in Fig. 2, the quill 31 is equipped with a gear rack 91 which meshes with a pinion (not shown) keyed to the end of a vertical shaft 92. The exposed end of shaft 92 is squared to provide for receiving a crank handle which is not shown. A graduated dial 93 is fixed to the shaft 92 for accurately measuring the amount of axial movement of the quill 31, which depends upon the degree of rotation of the shaft 92.

A manual control mechanism is provided for operating the clutch 57 and brake 59. As shown in Figs. 5 and 9, a control handle 94 is conveniently located so that it can be reached from the front or either side of the machine and extends downwardly where it is pivoted on a stud 95 secured to the column 22. An extension of the control handle 94 is shaped in the form of a fork 96 which engages an annular groove in the shifting collar 64. Thus, when the control handle 94 is moved to the left, it shifts the shifting collar 64 with its cooperating sleeve 58 to the right to engage the clutch 57 and set the spindles 23 and 24 in motion. When the control handle 94 is moved to the right, it disengages the clutch to interrupt the flow of power to the spindles and when moved fully to the right, the brake 59 is energized to apply a braking effect opposing the rotation of the spindles 23 and 24. When the control handle 94 is set in its central or neutral position, neither the clutch nor the brake are engaged.

Figure 13:
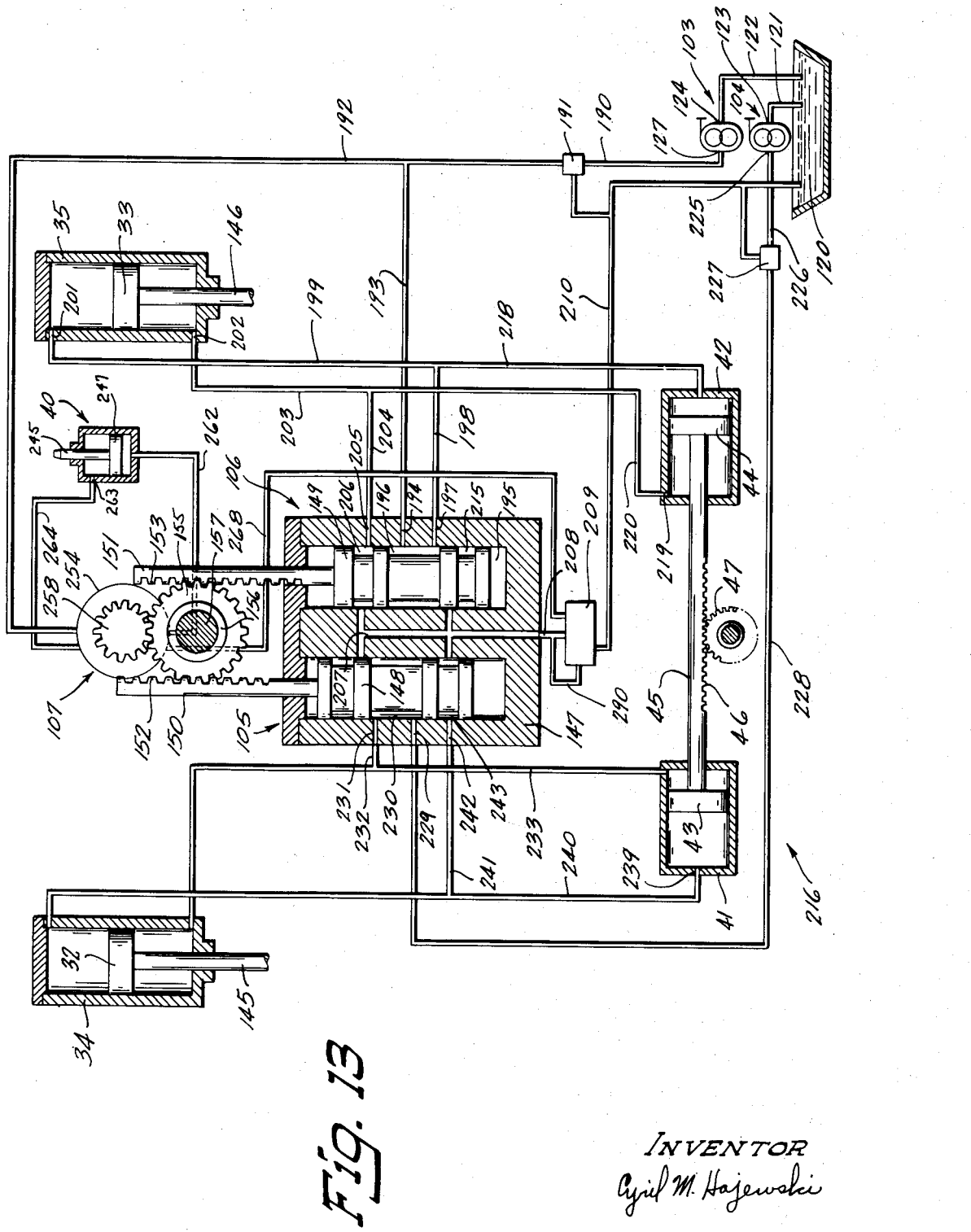
Fig. 13 is a schematic diagram of the automatic hydraulic control circuit for the milling machine.

The vertical bodily movements of the spindle heads 25 and 26, the oscillation of the table 39, and the operation of the table clamp 40 are effected through a hydraulic system in which fluid pressure is generated by two gear type pumps 103 and 104, shown in Fig. 5 and diagrammatically in Fig. 13. Two reverser valves 105 and 106 are provided for controlling the flow of fluid to the spindle head cylinders 34 and 35 and to the table cylinders 41 and 42, each reverser valve regulating the direction of flow to one spindle head cylinder and one table cylinder. The reverser valves are so arranged that when the fluid is flowing into the bottom of one cylinder, the other cylinder is receiving hydraulic pressure at its top. This results in moving the spindle head cylinder pistons in opposite directions and the table cylinder pistons in the same direction. A separate reverser valve 107 controls the operation of the table clamp 40. Upon the completion of each cutting stroke, it releases the table clamp 40 to unlock the table 39 and after the table completes its movement, the valve again operates to force the table clamp 40 to its locking position before the next cutting operation is initiated.

The pumps 103 and 104 are located in a common pump body 108 which is provided with two covers 109 and 110 for enclosing the mechanism. As indicated in Fig. 5, pump 103 is provided with a driving gear 111 and a driven gear 112 while pump 104 is comprised of a driving gear 113 and a driven gear 114. The driving gears 111 and 113 are keyed to the shaft 66 so that the pumps operate only when the clutch 57 is engaged to rotate the spindles 23 and 24. The driven gears 112 and 114 are rotatably supported on a stud 119 which is mounted in the pump body 108 and covers 109 and 110. Both pumps 103 and 104 are of identical design, their arrangement being clearly illustrated in Fig. 12, which depicts one of them. The pumps draw liquid from a sump 120 through conduits 121 and 122 to their respective intake ports 123 and 124. In the pump 103, illustrated in Fig. 12, the fluid proceeds from the intake port 124 into a channel 125 in the pump body 108 past the rotating pump gears 111 and 112, through a channel 126 to a discharge port 127, from which the hydraulic fluid is introduced into the hydraulic system to operate the several hydraulic motors.

The pumps 103 and 104 each are provided with a throttle adjustment for the purpose of controlling the quantity of hydraulic fluid flowing past the intake ports 123 and 124 and, consequently, the hydraulic pressure developed in the system to individually regulate the spindle feed rates. Since the throttle adjustment mechanism is the same for both pumps 103 and 104, only that of pump 103 will be described here. The throttling effect is obtained by restricting the opening of the intake port 124 by means of a tapered end 132 of a plunger 133. The plunger is supported in the pump body 108, with which it has threaded engagement in a threaded hole 134 so that axial adjustment of the plunger 133 is obtained by rotating it, resulting in the positioning of the tapered end 132 in relation to the intake port 124 to effect the desired restriction to the flow of hydraulic fluid to the pump 103. There is fixed to the end of the plunger 133, a bevel gear 135 which meshes with a complementary bevel gear 136 fixed to the end of a shaft 137, as shown in Figs. 3 and 8. The shaft 137 is rotatably supported in the column 22 and extends through a hole in the column beyond its outer surface to support a graduated dial 138 and a crank handle 139, Figs. 1 and 3. The dial 138 is graduated in terms of feed rate of the spindle head and is fixed to the column 22 so that it will not turn with the shaft 137, while the crank handle 139 is keyed to the shaft. A pointer 140 is attached to the crank handle 139 to revolve with it and indicate on the cooperating graduated dial 138 the spindle feed rate for the corresponding position of the valve plunger 133. An identical mechanism on the opposite side of the machine is provided for throttle adjustment of pump 104, thus permitting individual control of the feed rate for each of the spindles 23 and 24.

A separate hydraulic motor is provided for actuating each of the spindle heads in its transverse movements. The motors consist of the cylinders 34 and 35 and their cooperating pistons 32 and 33, respectively, with complementary piston rods 145 and 146 fixed to their respective pistons. The piston rods 145 and 146 extend downward beyond the bottoms of the cylinders and are attached to the spindle heads 25 and 26 to cause them to move along their guide bearings as the pistons 32 and 33 are actuated in their cylinders by hydraulic pressure.

As previously mentioned, two reverser valves are provided for controlling the direction of fluid flow to the cylinders 34 and 35. The valve 105 regulates the flow of fluid to the cylinder 34 while the valve 106 directs the flow of fluid to cylinder 35. The valves are enclosed in a single housing 147 in which are contained two slidable valve cores 148 and 149. Reverser valve actuating members 150 and 151 are attached to the tops of the valve cores 148 and 149, and extend through the top of the valve housing 147. As shown in Fig. 11, the valve actuating members 150 and 151 are provided with gear racks 152 and 153 respectively, which mesh with pinions 154 and 155 respectively, separated by a collar 156 and keyed to a shaft 157 which is rotatably supported at one end by a bracket 158 with the other end extending into a sleeve 159, so that it may rotate relative to the sleeve, the sleeve being rotatably mounted in a bracket 160. A third pinion 161 is mounted on the same axis, except that it is keyed to the sleeve 159 allowing it to rotate therewith independently of the shaft 157. The pinion 161 meshes with a gear rack 162 formed on the lower portion of a rod 163 which is slidably supported by brackets 164 and 165, being disposed to permit engagement of its gear rack 162 with the pinion 161 and to allow its upper portion to extend through an opening 166 into the spindle head 26. Two collars 167 and 168 are in threaded engagement with the rod 163 at its upper portion. The upper collar 167 is provided with a flange 169 which is of greater diameter than the opening 166, but the diameter of the remainder of the collar is small enough to permit it to extend downward through the opening 166 below the spindle head 26 to make it readily accessible from the outside of the machine for axial adjustment. The lower collar 168 is always readily available for axial adjustment along the rod 163. The position of the collars 167 and 168 on the rod 163 determines the length of stroke of the spindles 25 and 26, as well as the location of the stroke in the vertical path in which the spindles can travel, as will be seen from the following description.

As the spindle head 26 is moving under power in its upward stroke, it strikes the flange 169 of the collar 167 causing the rod 163 to move upward with it. Since the pinion 161 is in mesh with the gear rack 162 on the rod 163, any movement of the rod causes the pinion 161 to revolve with its cooperating sleeve 159. Two ears 170 and 171, best seen in Fig. 9, are attached to the sleeve 159 and are provided with two threaded holes for receiving two adjustable screws 172 and 173 which may be locked in position by a pair of lock nuts 174 and 175, respectively. A lug 176 is secured to the end of the shaft 157 and disposed immediately between the two ears 170 and 171. As the sleeve 159 is revolved, its associated ears move with it, resulting in one or the other of the screws 172 or 173 abutting the lug 176 to cause the shaft 157 to rotate with the sleeve. As the shaft 157 rotates, it causes the pinions 154 and 155 to revolve with it and they in turn actuate their cooperating valve members 150 and 151 to shift the valve cores 148 and 149 in opposite directions. Such movement continues until both of the valve cores 148 and 149 attain the same vertical height which represents their neutral position and at which point all flow of hydraulic pressure through the valves 105 and 106 is halted. If no further force were applied to move the valve cores 148 and 149, the transverse movement of the spindle heads 25 and 26 would terminate. For continuous automatic reciprocatory movement, a lost motion device is incorporated in the mechanism to impart the additional energy required to continue the movement of the valve cores after they have reached their neutral position.

The lost motion device includes a cam 180, Fig. 11, fixed to the sleeve 159, configurated to provide a central notch 181 with high points on each side of the notch. Disposed to cooperate with the cam is a spring urged plunger 182 inserted in a cylinder 183 and urged downwardly by a spring 189. The plunger 182 is tapered at its lower end to engage the notch 181 in the cam 180, and the pressure of spring 189 operates through the plunger 182 to continue the movement of the cam whenever the notch 181 moves past the tapered point of the plunger 183. To obtain continuous reciprocatory movement of the valves 105 and 106 through the cam and plunger arrangement, it is necessary that there be lost motion between the sleeve 159 and the shaft 157, and it is for this purpose that the adjustable screws 172 and 173 are provided on the ears 170 and 171, respectively. By the proper adjustment of these screws, lost motion may be eliminated so that no automatic reversal will occur, or they may be arranged so that lost motion occurs in one direction only and automatic reversal will occur correspondingly in only one direction, or they may be adjusted to provide for lost motion and the consequent automatic reversal in both directions so that the machine will operate continuously until manually stopped. The lock nuts 174 and 175 are provided to lock the screws 172 and 173 in the desired position.

For example, assuming that the screws 172 and 173 are adjusted to provide for lost motion in both directions, and the spindle head 26 is traveling downward in its cutting stroke, as the spindle head approaches the end of the stroke, it strikes the collar 168 causing the rod 163 to move downward with the spindle head and actuate the pinion 161 which is keyed to the sleeve 159. The cam 180 is secured to the sleeve to revolve with it as are the ears 170 and 171. The sleeve 159 and its associated cam 180 will therefore revolve a few degrees independently of the shaft 157 until the screw 172 strikes the lug 176 which is attached to the shaft 157, causing the shaft to move with it. The lost motion between the sleeve and shaft results in the cam moving ahead of the shaft. The spindle head 26 will continue to move downward until the valve cores 148 and 149 attain their central or neutral position at which point the movement would terminate because the flow of fluid through the valves 105 and 106 is blocked. At this point however, the notch 181 of the cam 180 has passed beyond the point of the plunger 182 and the spring 189 forces the cam 180 downward through the plunger 182, resulting in completion of the revolution of shaft 157 and movement of the valve cores 148 and 149 to their opposite positions, reversing the direction of flow of fluid to the spindle head cylinders 34 and 35, as well as the table cylinders 41 and 42. The spindle head 26 then begins to move upward until it strikes the flange 169 of the upper collar 167 and again moves the valve cores 148 and 149 to their neutral position. Since the screws 172 and 173 have been set to provide for lost motion in both directions, the cam 180 will again move ahead of the shaft 157 and the spring urged plunger 182 will force it downward after its notch 181 has passed the point of the plunger. Thus, the reciprocatory movement of the spindle heads and the table will continue until a handle 185 is located manually to place the plunger point in the notch 181 of the cam 180.

When this is accomplished, the flow of fluid through the valves 105 and 106 will terminate and the movement of the spindle heads and table will stop.

The reverser valves 105 and 106 also control the direction of fluid flow to the table cylinders 41 and 42, as well as to the spindle head cylinders 34 and 35, but the operation of the latter will be discussed first. Whenever the spindles are moving in a cutting stroke, one of the valve cores 148 or 149 is in its lower position, as shown in Fig. 13. Each of the spindle head motors is served by a separate pump and controlled by a separate valve so that the hydraulic fluid is received by the valve 105 from the pump 104 while the valve 106 is supplied with hydraulic fluid by the pump 103. The pump 103 discharges into a conduit 190 through a by-pass valve 191, and conduits 192 and 193 to an intake port 194. With the valves in the position illustrated in Fig. 13, the fluid enters a cylinder 195 of the valve 106 from the intake port 194 and flows through a groove 196 of the valve core 149, to a port 197 in the valve housing 147. From the port 197, the flow proceeds through a conduit 198 and a conduit 199 to a port 201 entering the top of the cylinder 35, to force the piston 33 and its associated spindle head 25 downward. The fluid is forced out of the bottom portion of the cylinder 35 by the downward movement of the piston 33, exhausting through a port 202, into a conduit 203 and a conduit 204 to a port 205 in the valve housing 147. From the port 205, the fluid enters the cylinder 195 and flows through a groove 206 in the valve core 149 to a channel 207 and is discharged from the valve housing through the channel 207 into a conduit 208 to a backpressure device 209 which will be later more fully described. The backpressure device 209 discharges the exhaust fluid into a conduit 210 which returns it to the reservoir 120.

The valve core 149 is depicted in its lower position in Fig. 13 for downward movement of the piston 33. When it moves to its upper position, the groove 196 moves out of registration with port 197 and into registration with the port 205, thus establishing communication between the ports 194 and 205, since port 194 always registers with the groove 196 regardless of the position of the valve core 149. As the groove 196 moves out of registration with the port 197, a groove 215 moves into registration with the port 197 to provide a means of communication between the latter and the exhaust channel 207. The upper lateral portion of the exhaust channel 207 is then blocked by the ungrooved portion of the valve core 149. When the valve core is in its lower position, the lower lateral portion of the exhaust channel 207 is blocked by the ungrooved portion of the valve core, as shown in the drawing. The shifting of the valve core 149 to its upper position thus causes a reversal in the direction of fluid flow to the cylinder 35 by virtue of the port 205 having come into communication with the intake port 194 in lieu of port 197 which was previously in communication with the intake port 194 when the valve core 149 was in its lower position. The fluid then is pumped into the valve housing 147 through the intake port 194, into the groove 196, to the port 205, through the conduits 204 and 203, into the bottom of the cylinder 35, forcing the piston 33 upward. The exhaust fluid is discharged at the top of the cylinder 35 through the port 201 into the conduits 199 and 198, thence to the port 197 and through the groove 215 into the exhaust channel 207, from which it is discharged from the valve housing 147.

The valve core 148 is of the same construction as the valve core 149 and it controls the direction of fluid flow to the cylinder 34 in the same manner as does the valve core 149 to the cylinder 35. During operation of the machine, the pistons 32 and 33 must be actuated in opposite directions, necessitating the valve cores 148 and 149 to always assume positions opposite one another so that when valve 105 is directing fluid to the bottom of cylinder 34, valve 106 is directing fluid to the top of the cylinder 35.

This relationship between the valve cores is maintained by means of the mechanism previously described.

When the spindle heads 25 and 26 are reversed in their movement, the table 39 must also move to its opposite position to present a new workpiece to the cutter. The table 39 is actuated by a hydraulic motor 216 comprising the two cylinders 41 and 42 to which fluid pressure is directed through the same reverser valves 105 and 106 which control the flow of fluid pressure to the spindle head cylinders 34 and 35. The spindle head 26 actuates the valve cores 148 and 149 at the end of each stroke, which reverses the direction of fluid flow to the table actuating motor 216, as well as to the spindle head cylinders 34 and 35.

With the valves 105 and 106 in the position shown in Fig. 13, the fluid flows to the cylinders 41 and 42 to force the pistons 43 and 44 to the left. The pressure for cylinder 42 is received from the pump 103 and delivered to the intake port 194 of the valve 106, into the groove 196 and out of the valve 106 through the port 197 into the conduit 198, from which it branches off to the conduit 199 to the spindle head cylinder 35 and a conduit 218 to the right end of cylinder 42 to force the piston 44 toward the left. The exhaust fluid is discharged from the cylinder 42 through a port 219, to a conduit 220 and the conduit 204 from which it enters the valve 106 through the port 205. From the port 205, the fluid flows into the groove 206 to the exhaust channel 207 from where it is discharged from the valve housing 147. The flow of hydraulic pressure from the pump 104 to the cylinder 41 is controlled in the same manner by the valve 105. As illustrated in Fig. 13, the fluid from the pump 104 flows from an exhaust port 225 into a conduit 226 and thence through a by-pass valve 227 into a conduit 228 to enter the valve 105 through a port 229. From the port 229 the fluid flows through a groove 230 of the valve core 148 to a port 231 and into a conduit 232, branching off to a conduit 233 to the right end of the cylinder 41 to force the piston 43 to the left just as the piston 44 is being forced to the left in the cylinder 42. The exhaust fluid is discharged from the left end of the cylinder 41 through a port 239, and flows through a conduit 240 and a conduit 241 into the valve 105 at a port 242, and thence through a groove 243 in the valve core 148 into the channel 207, from which it leaves the valve along with the exhaust fluid from the cylinder 42 and the spindle head cylinders 34 and 35.

Movement of the pistons 43 and 44 functions to actuate the common piston rod 45 in which is formed the gear rack 46 which engages the gear 47. The gear 47 is fixed to the table 39 so that when the gear rack 46 is actuated by hydraulic pressure through the pistons 43 and 44, it results in a movement of the table 39 through the gear 47, the table being limited in its movement to a predetermined arc so that each movement of the table results in a new workpiece being placed in the cutting position.

At the end of each movement, the table 39 is locked in position by means of the clamp or locking bolt 40 which engages either one of two spaced positioning holes 243 and 244 located in the table, as indicated in Fig. 4. The clamp 40, illustrated in Fig. 14, is comprised of a vertically disposed tapered plunger or bolt 245 slidable in a bore 246 located in the front part of the bed 38 and fixed to a piston 247 which fits into a cylinder 248 formed in the bed. The piston 247 and its associated plunger 245 are actuated by means of hydraulic pressure controlled through the separate reverser valve 107, mounted on the bracket 160 above the reverser valves 105 and 106. The reverser valve 107 is comprised of a cylinder 254 in which is rotatably supported a valve core 255, and a retainer 256 for retaining the valve core within the cylinder. A shaft 257 is concentrically fixed to the end of the valve core 255 and has keyed to it a spur gear 258 which engages the spur gear 154 on the shaft 157. The ratio between the gears 258 and 154 is such that each time the spindle head 26 actuates the valve cores 105 and 106, the consequent rotation of the shaft 257 will be just sufficient to turn the valve core 255 one half of a revolution. When the spindle heads 25 and 26 complete their next stroke, the valve core 255 is returned a half of a revolution.

The flow of hydraulic fluid to the clamp 40 through the reverser valve 107 can best be seen by referring to Fig. 14. The liquid is pumped from the reservoir 120 by the pump 103 through the conduit 190, the by-pass valve 191, and the conduit 192 into the reverser valve 107 through a port 259. With the valve core 255 in the position illustrated in Fig. 14, the fluid flows through a diametrical bore 260 in the valve core 255 and out the reverser valve through a port 261, into a conduit 262 to the bottom of the cylinder 248 to force the piston 247 upward and its associated plunger 245 into either of the positioning holes 243 or 244, depending upon the position of the table 39. The exhaust fluid is forced out of the top of the cylinder 248, through a port 263, into a conduit 264 and back into the reverser valve 107 through a port 265, to a groove 266 and is discharged from the reverser valve through a port 267 from which it flows into a conduit 268, leading to the back pressure device 209 and thence through the conduit 210 to return to the reservoir 120.

Assuming that the next movement of the spindle head 26 will act to revolve the valve core 255 clockwise as seen in Fig. 14, the bore 260 will move out of registration with the ports 259 and 261, but a groove 269 will move into registration with the ports 261 and 267 while the groove 266 moves out of registration with the port 267, but moves into registration with the intake port 259 to provide a means of communication between the ports 259 and 265. Therefore, during the period that the valve core 255 is moving through its half revolution, the flow of hydraulic pressure to the clamp 40 is reversed in a direction to unlock the table 39 and permit its movement. The flow of fluid through the bore 260 ceases and the hydraulic circuit is completed through the grooves 266 and 269. The hydraulic pressure from the pump 103 enters the reverser valve through the port 259 which now is in communication with the port 265 through the groove 266. The fluid then flows from the port 259 through the groove 266 to the port 265, and thence through the conduit 264 to the top of the cylinder 248 to force the piston 247 downward and withdraw the plunger 245 from the hole 243 or 244, whichever it is in engagement with. The exhaust fluid is discharged from the bottom of the cylinder 248 through a port 274 into the conduit 262 to the port 261 and thence through the groove 269. The fluid then flows through the groove 269 and out the reverser valve through the port 267, to the conduit 268, through the back pressure device 209, into the conduit 210 which carries it back to the reservoir 120.

The flow of fluid to the clamp 40 continues in this manner while the valve core 255 is being revolved until a half turn is completed, when the bore 260 again comes into registration with the ports 259 and 261, reversing the direction of flow again to the bottom of the cylinder 248 to force the plunger 245 into one of its cooperating openings 243 or 244, depending upon the position of the table, to lock it. The hydraulic circuit is the same as was previously described before the valve core 255 was turned 180°, except that now the groove 269 is in registration with the ports 265 and 267 in lieu of the groove 266, so that the exhaust fluid now flows from the port 265 to the port 267 through the groove 269, while the groove 266 is on the opposite side and not functioning. Upon completing its next stroke, the spindle head 26 will actuate the valve core 255 in the opposite direction to again reverse the flow of fluid while the valve core 255 is rotating to release the clamp 40 until a half of a revolution is completed to bring the ports 259 and 261 into communication and reverse the flow to again lock the table 39.

The spur gear 258 which serves to rotate the valve core 255 is loosely keyed on the shaft 257 so that it will revolve on the shaft a predetermined number of degrees after being actuated by the spindle head 26, before it will begin to turn the shaft and, consequently, the valve core 255. Thus, when the spindle head actuates the valves 148 and 149 of reverser valves 105 and 106, the gear 258 is also actuated, but it begins to turn on the shaft without moving the valve core 255. Just before the valve cores 148 and 149 reach their neutral positions, the gear 258 becomes engaged with the shaft 257 and the valve core 255 then begins to function. This is desirable so that the clamp remains in its locking position until just before the table 39 is moved and after the spindles have completed their cutting strokes. As the valve cores 148 and 149 reach their neutral position, the clamp 40 unlocks to free the table 39 and remains unlocked while the valve core 255 is turning and the reverser valves 105 and 106 are functioning to reverse the flow of fluid to the spindle head and table cylinders. On the other hand, the bore 260 of the valve core 255 does not return to register with the ports 259 and 261 until the valve cores 148 and 149 have functioned to reverse the flow of fluid to the table cylinders 41 and 42, and caused the table to complete its movement. When the valve 107 functions to actuate the clamp 40 to its locking position, the table 39 is in the cutting position and either the hole 243 or the hole 244 is properly located to receive the plunger 245 to lock the table.

The back pressure device 209 shown in Figs. 6 and 7 is provided to maintain a predetermined back pressure in the hydraulic system. The device consists of a piston 275 with an attached plunger 276 slidable in a cylinder 277 formed in a housing 278. The piston 275 with its associated plunger 276 is constantly urged to the left by a spring 279. The plunger 276 is provided with a groove 280 and extends beyond the cylinder 277 into a bore 281. The exhaust fluid from the reverser valves 105 and 106 enters the back pressure device through the conduit 208 and a port 282 and the exhaust fluid from the reverser valve 107 enters through the conduit 268 and a port 283, both ports leading to a bore 284 in the valve housing 278. The groove 280 is the means of communication between the bore 284 and an exhaust port 285 when the plunger 276 is urged to the right and the groove registers with the ports. When the plunger is forced to the left by the pressure from the spring 279, the groove 280 does not register with the bore 284 and the port 285, and the plunger 276 blocks the flow of fluid. A conduit 290 branches off from the exhaust conduit 208 and leads to a port 291 at the left end of the cylinder 277 to supply hydraulic pressure for actuating the piston 275. Under normal conditions, the back pressure exerted on the piston 275 is sufficient to overcome the resistance of the spring 279 and force the piston and plunger back so that the groove 280 is in registration with the bore 284 and the port 285 to permit an unrestricted flow of fluid through the back pressure device. When the back pressure falls below a predetermined value, the spring 279 forces the piston back so that the groove 280 moves out of registration with the bore 284 and the port 285, as shown in Fig. 7, to restrict or shut off the flow of fluid until the pressure again builds up sufficiently to overcome the resistance of the spring.

As indicated in Fig. 13, two by-pass valves 191 and 227 of well known construction are provided, one for each pump to by-pass the fluid back to the reservoir when the reverser valves 105 and 106 are in the neutral position and no fluid is passing through them. The by-pass valves also act as safety devices to protect the hydraulic system from injury if excessive pressures are generated within the system.

To initiate a machining operation on a large number of workpieces, the necessary adjustments are first accomplished to conform to the operation to be performed. A workpiece is loaded into each of the work holders and the control handle 94 is actuated to engage the clutch and initiate rotation of the spindles and operation of the hydraulic pumps. The next step is to pivot the control handle 185 from its central position to manually move the valve cores 148 and 149 of the valves 105 and 106 to initiate movement of the spindle heads.

The spindle heads begin their transverse movement in opposite directions until the spindle head 26 strikes the flange 169 of the collar 167. Assuming that the spindle head 26 was initiated in its movement in an upward direction, continued movement of the spindle head 26 causes a corresponding movement of the control rod 163 to actuate the control valves. The table clamp control valve 107 functions first to release the table clamp and unlock the table before the valve cores 148 and 149 of the valves 105 and 106 reach their dead center position.

When the valve cores 148 and 149 reach the dead center position, the flow of fluid to the hydraulic motors terminates, but the lost motion device previously described takes over, supplying the necessary energy to permit the valve cores to complete their movement. With the valve cores moved beyond the dead center position, the flow of fluid to the spindle head and table motors is reversed, causing the table to be pivoted to its alternate position and the direction of travel of the spindle heads to be reversed.

Movement of the table occurs shortly after the valve cores 148 and 149 pass the dead center position while the valve 107 does not reverse the flow of fluid to the table clamp until the valve cores 148 and 149 reach their final position so that the table clamp is not actuated again, until the table has completed its movement. The table is then locked in its new position and another machining operation is performed. While the machining operation is in progress, the operator is replacing the completed workpiece at the other work holder which was removed from the path of travel of its cooperating cutter when the table pivoted to its alternate position. This cycle of operation is repeated automatically, resulting in substantially continuous machining of production pieces, until the machine is manually stopped by centrally positioning the control handle 185.

From the foregoing detailed description of the illustrative structures set forth herein to disclose the principles of the present invention, it is apparent that there has been provided an improved type of milling machine capable of substantially continuous milling and of vastly increasing the production of a single operator.

Although the foregoing detailed description and the accompanying drawings are directed specifically to a particular apparatus for the purpose of fully disclosing an exemplifying operative embodiment of the invention, it is to be understood that the particular structures shown and herein described are intended to be illustrative only, and that various features of the invention may be incorporated in other forms and constructions without departing from the spirit and scope of the invention as defined in the subjoined claims.

The principles of the invention having now been fully explained in connection with the foregoing description of embodying structure, I hereby claim as my invention:

1. In a milling machine having a frame and a base, a pair of spindle heads slidably mounted for transverse movement on said frame, two hydraulic motors each connected to move one of said spindle heads by power along said frame, a control valve having two cores with each core arranged to control the direction of movement of one of said hydraulic motors, an extension fixed to each of said valve cores and protruding from the body of said control valve, a gear rack formed on each of said extensions, a shaft rotatably mounted on said frame extending between said extensions, a pair of pinions keyed to said shaft, each disposed to mesh with one of said gear racks, a sleeve mounted on said shaft to rotate relative to it a predetermined number of degrees to provide lost motion, a third pinion keyed to said sleeve, a cam secured to the periphery of said sleeve, a spring urged plunger slidably mounted on said frame to engage said cam, a rod extending into one of said spindle heads slidably mounted on said frame in juxtaposition to said third pinion, a gear rack formed on said rod in position to mesh with said third pinion, an abutment adjustably mounted on said rod within said spindle head, and a second abutment adjustably mounted on said rod without said spindle head, said abutments being so arranged and constructed that as said spindle head approaches the end of its stroke, it strikes one or the other of said abutments depending upon its direction of movement to move said rod and its associated gear rack whereby said sleeve and its associated cam are rotated relative to said shaft through said third pinion until the lost motion between said sleeve and said shaft is taken up when said shaft begins to rotate with said sleeve to revolve said pair of pinions, causing one of said extensions and its associated valve core to move in one direction and the other extension with its associated valve core to move in the other direction until both valve cores attain the dead center position where further movement of said spindle heads would cease, when said plunger forces said cam which has proceeded beyond its center position due to the lost motion between said sleeve and said shaft, through the remainder of its movement to rotate said shaft and said pair of pinions with it, causing said valve cores to move to their extreme positions and reverse the direction of movement of said spindle heads.

2. In a milling machine, a base, an upstanding column structure mounted on said base, a bed carried by said base, a work supporting table pivotably mounted on said bed, a pair of spindle heads slidably mounted on said column to move transversely of said table, a clamp disposed to lock said table in position, a pair of motors each connected to move one of said spindle heads by power in its path of movement, a third motor connected to pivot said table through a pre-established arc in either direction, a fourth motor arranged to actuate said clamp, a control element connected to determine the direction of movement of said spindle head motors and said table motor and direct said spindle head motors to move said spindle heads continuously in opposite directions so that as one spindle head is operating in its cutting stroke the other is returning in its idle stroke, a second control element connected to control the operation of said fourth motor, a control element actuating rod disposed adjacent to one of said spindle heads to cooperate with it and connected to actuate both of said control elements when moved to reverse the operation of said spindle head and table motors and reverse the operation of said clamp actuating motor twice to first release the clamp and then return it to its locking position after said table has completed its movement, a first abutment adjustably mounted on said control element actuating rod to be engaged by said cooperating spindle head as it approaches the end of its cutting stroke to move said control element actuating rod, and, consequently, actuate both of said control elements, and a second abutment adjustably mounted on said control element actuating rod to be engaged by said cooperating spindle head as it approaches the end of its idle stroke to move said control element actuating rod, and, consequently, actuate both of said control elements whereby at the end of each stroke of said spindle heads, said control element actuating rod is moved to actuate both of said control elements and thereby reverse the direction of movement of said spindle heads, release said table clamp, pivot said table to its alternate position and upon the completion of the movement of said table, actuate said clamp to again lock the table in position.

3. In a milling machine, a frame, a bed mounted on said frame, a pair of spindle heads slidably mounted on said frame, a tool carrying spindle rotatably mounted in each of said spindle heads, a cylinder mounted above each of said spindle heads, a piston contained within each of said cylinders and connected to the associated spindle head, a pump connected to supply pressure fluid, a valve body having two cylinders with each cylinder connected to receive fluid from said pump, two valve cores, each slidably contained within one of said valve body cylinders, a valve actuating member secured to one end of each of said valve cores and extending therefrom to protrude from said valve body, a gear rack formed on each of said valve actuating members, a shaft rotatably supported by said frame to extend between said valve actuating members, a pair of pinions keyed to said shaft in position for each to mesh with one of said gear racks, a third pinion keyed to said shaft, a rod slidably supported by said frame disposed transversely of said shaft and extending into one of said spindle heads, a third gear rack formed on said rod in position to mesh with said third pinion, an abutment adjustably mounted on said rod within said spindle head, and a second abutment adjustably mounted on said rod without said spindle head, said abutments being so constructed and arranged that as said spindle head approaches the end of its vertical movement, it strikes either one of said abutments depending upon its direction of travel to move said rod in the corresponding direction, whereby the movement of said rod revolves said third pinion through said third gear rack to revolve said shaft and with it said pair of pinions, one of which moves its cooperating valve actuating member through its gear rack, and the associated valve core in one direction, while the other moves its cooperating valve actuating member through its gear rack, and the associated valve core in the other direction, to reverse the direction of fluid flow in said spindle head cylinders.

4. In a milling machine, a base, an upstanding column structure mounted on said base, two cutter carrying rotatable spindles slidably supported for vertical movement on said column structure, a bed mounted on said base, a work supporting table mounted to pivot on said bed, two work holders on said table each adjacent to the vertical path of travel of one of said spindles, two cylinders mounted on said column structure each proximate to one of said spindles, a piston enclosed within each of said cylinders and attached to move said spindles in their vertical path of movement, two table cylinders located adjacent to said table, a piston enclosed within each of said table cylinders, a single connecting rod disposed to connect the two pistons enclosed in said table cylinders, a gear rack formed on said connecting rod, a gear fixed to said table and in meshing engagement with said gear rack, a source of fluid, a pump connected to pump the fluid from said source, and a valve connected to receive the fluid from said pump and distribute it to said table cylinders and said spindle cylinders in a manner to move both of the pistons of said table cylinders in the same direction to pivot the table through said gear and gear rack and move one of the pistons of said spindle cylinders upwardly while the other is being forced downwardly, said valve being so constructed and arranged as to effect a reversal of the direction of vertical movement of said spindles after they have traveled a predetermined distance and at the same time, cause said table to pivot to its alternate position to present a new workpiece to the spindle initiating its downward movement.

5. In a milling machine having a frame and a base, a pair of spindle heads slidably mounted on said frame, a motor connected to each of said spindle heads to move it by power along said frame, a control element connected to control said motors to determine the direction of movement of said spindle heads along said frame, a control rod extending into one of said spindle heads and connected to actuate said control element when moved to reverse the direction of movement of said motors, an abutment adjustably mounted on said control rod within said spindle head, and a second abutment adjustably mounted on said control rod without said spindle head, said abutments being so arranged and constructed that as said spindle head approaches the end of its stroke, it strikes one or the other of said abutments depending upon its direction of movement to move said control rod and thus actuate said control element to reverse the direction of movement of said spindle heads.

6. In a machine tool, a bed, a supporting column structure, a work supporting table pivotally mounted on said bed, a pair of tool carrying spindles slidably mounted on said column structure, a pair of motors each connected to effect movement of one of said spindles by power, a third motor connected to pivot said table by power into either one of two positions, a clamp carried by said bed in position to engage the table to lock it in a desired position, a source of power, a distributor connected to receive power from said source and direct it to the spindle and table motors to cause the spindles to move simultaneously in opposite directions, and to be actuated by the movement of the spindles after a predetermined distance of spindle travel to reverse the flow of power to the spindle and table motors for reversing the direction of spindle movement and pivoting the table to its alternate position, and a control element connected to receive power from said source and direct it to operate said table clamp, said control element being selectively actuable by the movement of the spindles to reverse the flow of power to the table clamp to release the table prior to its movement in response to the position of the spindles and lock it again after its movement has been completed, whereby the table movement serves to present a new workpiece to the spindle initiating its cutting stroke, and withdraws a completed workpiece from the spindle initiating its idle stroke to a position where it may be replaced by the operator.

7. In a milling machine, a base, an upstanding column structure mounted on said base, a bed mounted on said base, a work supporting table mounted on said bed for pivotal movement to two extreme positions, a pair of tool carrying spindles slidably mounted on said column structure in position to cooperate with said work table for operating upon workpieces supported by said table, a hydraulic motor connected to each of said spindles to move it along the column by power, a hydraulic motor connected to said work supporting table to pivot it by power, a control valve connected to selectively direct the flow of hydraulic pressure to said spindle and table motors for operation in either direction with the spindle motors always operating in opposite directions to drive one spindle in a cutting stroke and the other in an idle stroke, said control valve being connected for actuation by said spindles upon a predetermined distance of travel to reverse the flow of hydraulic pressure to said motors for reversing the direction of movement of said oppositely moving spindles and causing said table to pivot to its alternate extreme position, whereby the spindle completing its cutting stroke is initiated in its idle stroke while the other spindle to which a new workpiece is presented by the pivoting of said table is started in its cutting stroke.

8. In a milling machine, a frame, a bed mounted on said frame, a work supporting table pivotally mounted on said bed, two work holding stations located on said table, a pair of cutter carrying spindles slidably supported by said frame, each in position to cooperate with one of said work stations for operation upon workpieces held therein, a pair of motors each connected to drive one of said spindles in its transverse movements, a third motor connected to pivot said table into either one of two positions, each position presenting one work station to its cooperating cutter and locating the other work station in loading position removed from the path of travel of its cooperating cutter, a source of power, a distributor connected to receive power from said source and to distribute it to said motors for selective control of their direction of movement with said spindle motors always operating in opposite directions, and a control rod connected to be moved in either direction by one of said spindles as it travels in its path of movement and also connected to actuate said distributor when moved to reverse the flow of power to said spindle and table motors for reversing the direction of spindle movement and pivoting the table to its alternate position.

9. In a milling machine, a frame, a bed mounted on said frame, a pivotable work supporting table carried by said bed, a pair of tool carrying spindles slidably mounted on said frame in position to cooperate with said table for operating upon workpieces mounted thereon, a pair of motors each connected to move one of said spindles along said frame by power, a third motor connected to pivot said table into either one of two positions by power, a source of power, and a distributor connected to receive power from said source and distribute it to said motors for driving them in either direction selectively with said spindle motors operating in opposite directions so that while one spindle is being moved in a cutting stroke the other is being moved in a return stroke, said distributor being responsive to the movement of said spindles to reverse the flow of power to said motors and thereby reverse the direction of movement of said oppositely moving spindles and pivot the table to its alternate position.

10. In a milling machine having a frame and a base, a pair of spindle heads slidably mounted on said frame, a pair of cylinders mounted on said frame, each adjacent to one of said spindle heads, a piston contained within each of said cylinders and attached to one of said spindle heads to slide it along the frame whenever the piston is moved within its cooperating cylinder, a source of fluid, a pump connected to draw fluid from said source, a valve connected to receive fluid from said pump and direct it to said cylinders for actuating their associated pistons to move the spindle heads in opposite directions simultaneously, said valve being actuable to reverse the flow of fluid to said cylinders for reversing the direction of movement of the spindles, a rod slidably supported in said frame in position to extend into one of the spindle heads, said rod being connected to actuate said valve when moved to reverse the flow of fluid to the cylinders and thereby change the direction of movement of the spindle heads, an abutment adjustably mounted on said rod within the spindle head to be engaged by the interior structure of the spindle head as it is moving upwardly to move the rod and thereby actuate said valve to reverse the direction of movement of the spindle heads, and a second abutment adjustably mounted on said rod outwardly of the spindle head to be engaged by the exterior structure of the spindle head as it is moving downwardly to move the rod and thereby actuate said valve to again reverse the direction of movement of the spindle heads.

11. In a milling machine, a frame, a bed mounted on said frame, a work supporting table pivotally mounted on said bed, two work holding stations located on said table for holding workpieces in position to be operated upon, a pair of cutter carrying spindles slidably supported by said frame for transverse movement in position to cooperate with said work stations for operating upon workpieces held therein, a pair of motors, each connected to one of said spindles to move it by power in its transverse movement, a third motor engaged to pivot said table by power into either one of two positions, each position presenting one of said work holding stations to its cooperating cutter, a source of power, and a distributor connected to receive power from said source and distribute it to said motors for driving them in either direction selectively with said spindle motors operating in opposite directions so that while one spindle is being moved in a cutting stroke the other is being moved in a return stroke, said distributor being responsive to the movement of said spindles to reverse the flow of power to said motors and thereby reverse the direction of movement of said oppositely moving spindles and pivot the table to its alternate position.

References Cited in the file of this patent

UNITED STATES PATENTS

| | | |
|---|---|---|
| 983,225 | Grohmann | Jan. 31, 1911 |
| 1,838,816 | Fickett et al. | Dec. 29, 1931 |
| 1,843,345 | Sundstrand | Feb. 2, 1932 |
| 1,899,654 | Ward | Feb. 28, 1933 |
| 2,107,578 | Onsrud | Feb. 8, 1938 |
| 2,118,260 | Marsilius | May 24, 1938 |
| 2,482,126 | Purvin | Sept. 20, 1949 |